(12) United States Patent
Gipp et al.

(10) Patent No.: US 7,941,621 B1
(45) Date of Patent: May 10, 2011

(54) AUTOMATICALLY MOUNTING AND UNMOUNTING A VOLUME DURING A BACKUP OR RESTORE OPERATION

(75) Inventors: Stephan K. Gipp, Inver Grove Heights, MN (US); Girish S. Jorapurkar, Roseville, MN (US); Steven Kappel, Savage, MN (US); James P. Ohr, Saint Paul, MN (US); Shelley A. Schmokel, Prior Lake, MN (US); Timothy J. Stevens, Andover, MN (US); Weibao Wu, Vadnais Heights, MN (US)

(73) Assignee: Symantec Corporation, Mountain View, CA (US)

( * ) Notice: Subject to any disclaimer, the term of this patent is extended or adjusted under 35 U.S.C. 154(b) by 395 days.

(21) Appl. No.: 11/731,439

(22) Filed: Mar. 30, 2007

(51) Int. Cl.
G06F 12/16 (2006.01)
(52) U.S. Cl. .............. 711/162; 711/E12.103; 718/104
(58) Field of Classification Search ................. 711/162
See application file for complete search history.

(56) References Cited

U.S. PATENT DOCUMENTS

| | | | |
|---|---|---|---|
| 6,671,820 B1 * | 12/2003 | Kelman .......................... 714/4 |
| 6,799,258 B1 * | 9/2004 | Linde ........................... 711/162 |
| 6,823,336 B1 | 11/2004 | Srinivasan |
| 6,938,039 B1 | 8/2005 | Bober |
| 6,978,282 B1 * | 12/2005 | Dings et al. .................... 707/204 |
| 7,174,433 B2 * | 2/2007 | Kottomtharayil et al. ..... 711/147 |
| 7,496,723 B1 * | 2/2009 | Hanavan, III ................. 711/162 |
| 2003/0179227 A1 * | 9/2003 | Ahmad et al. ................ 345/736 |
| 2003/0212920 A1 * | 11/2003 | Fujibayashi ...................... 714/7 |
| 2004/0205293 A1 * | 10/2004 | Asahi ............................ 711/114 |
| 2005/0204108 A1 * | 9/2005 | Ofek et al. .................... 711/162 |
| 2007/0174566 A1 * | 7/2007 | Kaneda et al. ................ 711/162 |
| 2007/0250302 A1 * | 10/2007 | Xu et al. ......................... 703/20 |
| 2008/0072002 A1 * | 3/2008 | Kuwahara et al. ............ 711/162 |

OTHER PUBLICATIONS

Bill King. "LUN Masking in a SAN." Jun. 2001. QLogic Corporation.*

* cited by examiner

*Primary Examiner* — Reginald G Bragdon
*Assistant Examiner* — Nathan Sadler
(74) *Attorney, Agent, or Firm* — Meyertons, Hood, Kivlin, Kowert & Goetzel, P.C.

(57) ABSTRACT

A method, system, and computer-readable storage medium are disclosed for sharing non-distributed, random-access storage resources among a plurality of computer systems. A first backup or restore operation may be initiated. In response to initiation of the first backup or restore operation, a volume of a random-access storage device may be automatically mounted at a first computer system. The random-access storage device may be coupled to the first computer system by a network, and the volume may store a non-distributed file system. The first backup or restore operation may be completed by transmitting a first set of data between the random-access storage device and the first computer system. In response to completion of the first backup or restore operation, the volume of the random-access storage device may be automatically unmounted at the first computer system.

20 Claims, 6 Drawing Sheets

AUTOMATICALLY MOUNTING AND UNMOUNTING A VOLUME DURING A BACKUP OR RESTORE OPERATION

BACKGROUND OF THE INVENTION

1. Field of the Invention

This invention is related to the field of computer systems and, more particularly, to the sharing of non-distributed, random-access storage.

2. Description of the Related Art

Enterprise computing systems are increasingly using configurations such as storage area networks (SANs), network attached storage (NAS), and other centralized storage mechanisms to simplify storage, improve availability, and handle escalating demands for data and applications. The storage area network (SAN) model places storage on its own dedicated network. This dedicated network most commonly uses Fibre Channel technology as a versatile, high-speed transport. The SAN may include one or more storage hosts that provide a point of interface with local area network (LAN) users and may also include one or more fabric switches, SAN hubs, and/or other intermediate entities to accommodate a large number of storage devices. The hardware (e.g., switches, hubs, bridges, routers, cables, etc.) that connects servers to storage devices in a SAN is referred to as a "disk fabric" or "fabric." The SAN fabric may enable server-to-storage device connectivity through Fibre Channel switching technology to a wide range of servers and storage devices.

As the size and complexity of networked computing environments are increasing, so too are the demands placed on backup solutions. Tape devices have traditionally been used as a high-capacity backup medium. To permit more efficient use of tape resources, backup solutions (e.g., NetBackup™ with Shared Storage Option) from Symantec Corporation have provided for the sharing of tape devices in a networked backup environment. Additionally, it may be desirable to use available disk-based storage (e.g., in a SAN) for backup, either as a final backup destination or as an intermediate location for staging the data to tape.

One prior approach has used a single server and its associated storage to provide backup for other computer systems on a network. By providing a single point of execution, this configuration may be subject to media contention issues and other limitations in system resources (e.g., CPU cycles, available memory, I/O bandwidth, etc.). By providing a single point of failure, this configuration may be vulnerable to errors in both hardware (e.g., CPU, memory, network and storage interfaces, power supply, etc.) and software (e.g., operating system, drivers, backup software, etc.).

Distributed file systems or clustered file systems typically support the sharing of persistent storage resources among multiple hosts over a network. Examples of such file systems include Network File System (NFS) and Common Internet File System (CIFS). However, such file systems may not be usable in all environments due to limited hardware support, limited scalability, and/or undesirable overhead.

SUMMARY

A method, system, and computer-readable storage medium are disclosed for sharing non-distributed, random-access storage resources among a plurality of computer systems. Networked storage resources (e.g., in a SAN) may be partitioned into a plurality of volumes. Each volume may be a component of a non-distributed storage stack (e.g., a single-node or single-host storage stack) such that the volume is accessible by one host at a time. In one embodiment, a volume may host a non-distributed (i.e., single-host) file system. According to one embodiment, a volume is made accessible to one server at a time for the purpose of performing a backup or restore operation using the volume. The volume may be made inaccessible to other servers during the backup or restore operation. A centralized or distributed controlling component such as a master server may arbitrate the access of a plurality of servers to each volume.

According to one embodiment, in response to initiation of an backup or restore operation, a volume of a random-access storage device may be automatically mounted at a computer system. The backup or restore operation may be completed by transmitting a set of data between the random-access storage device and the computer system. In response to completion of the backup or restore operation, the volume of the random-access storage device may be automatically unmounted at the computer system. In a similar manner, the volume may be subsequently accessed by another computer system to perform another backup or restore operation on the same set of data or a different set of data.

Facilities provided by a storage area network (SAN) or a SAN volume manager may be used to make the shared volume inaccessible during a backup or restore operation. In one embodiment, a Logical Unit Number (LUN) comprising the volume may be masked from other computer systems using standard LUN-masking techniques. In one embodiment, the volume may be placed in a storage area network (SAN) zone that is inaccessible to other computer systems. In one embodiment, other computer systems may be permitted to read from a snapshot of the volume during the backup or restore operation.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Using embodiments of the systems and methods described herein, random-access storage resources (e.g., disk-based storage) that are not part of a distributed file system may be shared by a plurality of servers in a networked environment. By using a plurality of servers in addition to a plurality of storage devices, single points of failure and single points of execution may be eliminated to improve the fault tolerance, scalability, and performance of the networked backup environment. FIGS. 1, 2, 3, and 6 illustrate examples of computer systems and networked environments that may be used with the systems and methods for storage sharing described herein. The example configurations shown in FIGS. 1, 2, 3, and 6, and the quantity and kind of elements shown therein, are intended to be illustrative rather than limiting, and other embodiments are possible and contemplated.

Figure 1:
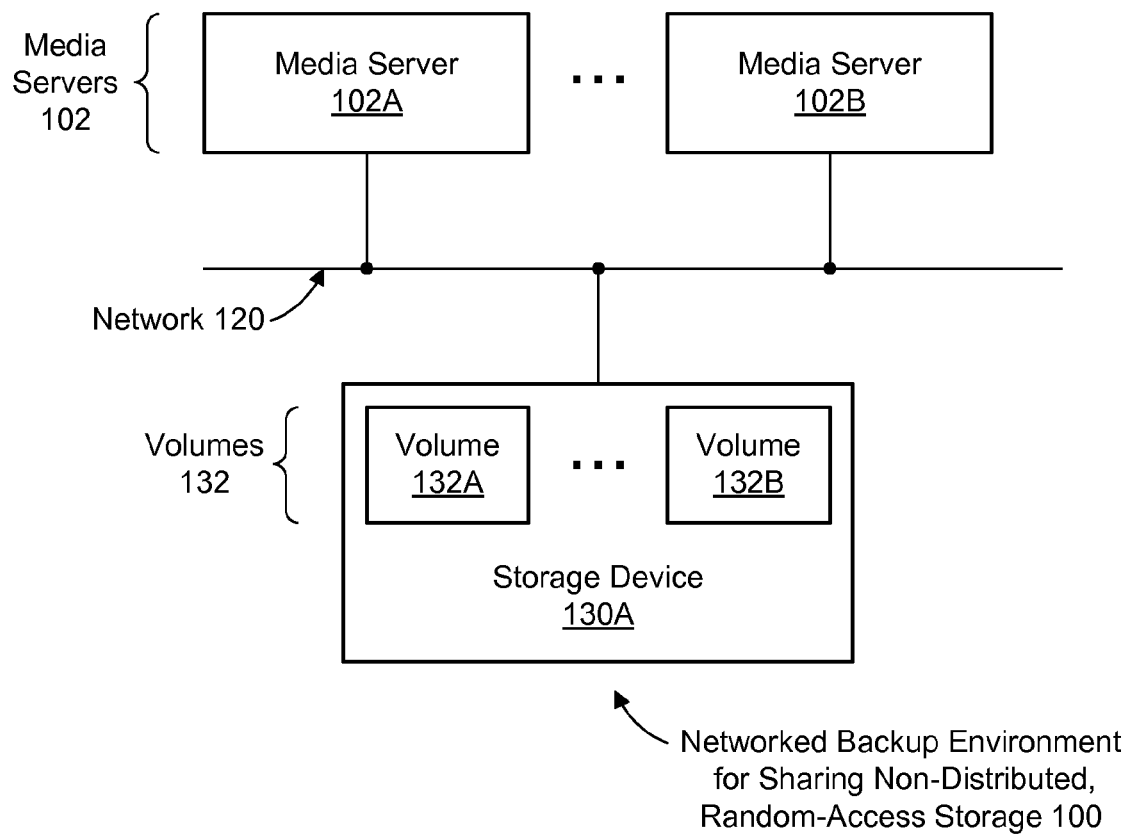
FIG. 1 illustrates a networked backup environment for sharing non-distributed, random-access storage according to one embodiment.

FIG. 1 illustrates a networked backup environment 100 for sharing non-distributed, random-access storage according to one embodiment. In one embodiment, the networked backup environment 100 may utilize any of various suitable backup solutions (e.g., NetBackup™ with Shared Storage Option for Disk) from Symantec Corporation. A plurality of computer systems referred to as media servers (e.g., media server 102A and media server 102B) may be coupled to one or more random-access storage devices (e.g., storage device 130A) over a network 120. The random-access storage devices may include hard disk drives, disk arrays, and other suitable storage technologies. The media servers may be referred to collectively as media servers 102. In the networked backup environment 100, the primary role of the media servers 102 may be to move data from primary storage to backup storage. Accordingly, the media servers 102 may also be referred to as data movers. In one embodiment, the networked backup environment 100 may also include sequential-access storage devices such as tape devices.

Each storage device may be partitioned into one or more logical volumes (e.g., volume 132A and volume 132B) or other independently accessible portions. The volumes may be referred to collectively as volumes 132. In one embodiment, each storage device 130A may include one or more Logical Unit Numbers (LUNs), each of which stores one or more of the volumes 132. A LUN may comprise an externally addressable entity within a target device that implements a SCSI device model. The pool of LUNs to be shared by the set of media servers 102 may be referred to as a disk pool. Each of the volumes 132 may be a component of a non-distributed storage stack (i.e., a single-node or single-host storage stack) such that the volume is accessible by one host at a time. Generally, a non-distributed storage stack may include file systems, volume managers, device drivers, storage devices, and/or other components that operate together to provide access to the storage such that input/output (I/O) for the storage is managed by only one host computer system (e.g., one of the media servers 102) at any given time. In one embodiment, a volume may host a non-distributed (i.e., single-host) file system. The non-distributed file systems may vary in kind from volume to volume or from storage device to storage device. Individual volumes 132 and the backup images stored within the volumes may be dynamically shared by the plurality of media servers 102. As is described in greater detail below, the shared volumes 132 may be used by the media servers 102 for backup operations (i.e., backing up data to the volumes 132) and restore operations (i.e., restoring data from the volumes 132).

Figure 2:
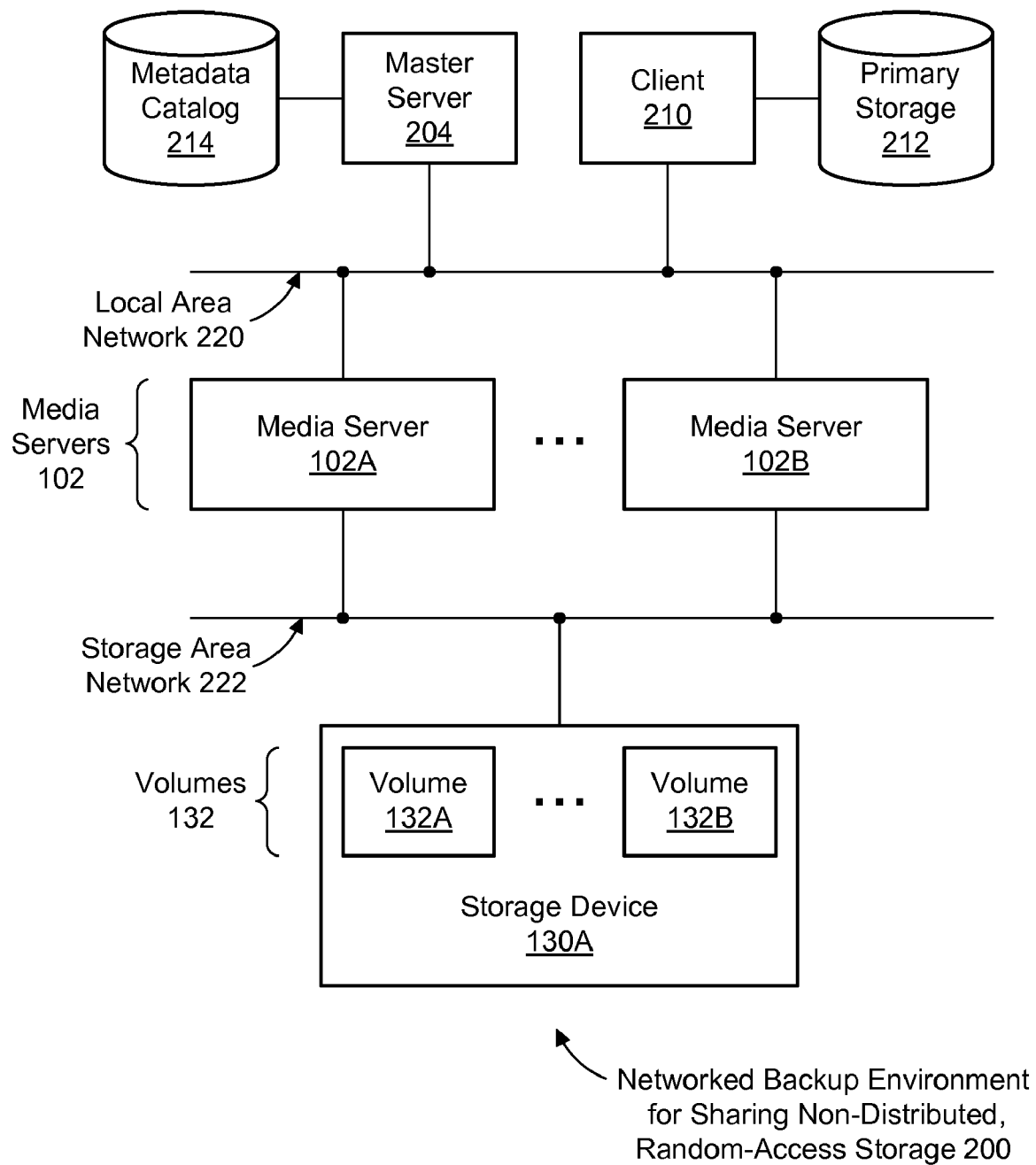
FIG. 2 illustrates a networked backup environment for backing up data from primary storage to shared secondary storage according to one embodiment.

FIG. 2 illustrates a networked backup environment 200 for backing up data from primary storage 212 to shared secondary storage 130A according to one embodiment. In one embodiment, the networked backup environment 200 may utilize any of various suitable backup solutions (e.g., NetBackup™ with Shared Storage Option for Disk) from Symantec Corporation. A plurality of computer systems referred to as media servers (e.g., media server 102A and media server 102B) may be coupled to one or more storage devices (e.g., storage device 130A) over a storage area network (SAN) 222. The media servers 102 may also be coupled to other entities (e.g., at least one client 210 and a master server 204) over a local area network (LAN) 220. The client 210 may be attached (directly or over a network) to primary storage 212 from which data is backed up in a backup operation or to which data is restored in a restore operation. Each client 210 may include a client agent that communicates with one of the media servers 102 and/or the master server 204 in performing the backup or restore operations.

In one embodiment, the master server 204 may manage data protection activities such as the scheduling of backup operations and the maintenance of tape and file catalogs. The master server 204 may be coupled to one or more storage devices such as a metadata catalog 214 that stores metadata usable for management of the networked backup environment 200. In one embodiment, the master server 204 or another controlling component may provide for allocation of the shared volumes 132 between the media servers 102. The controlling component may be centralized or distributed in various embodiments. As will be described in greater detail below, access by the media servers 102 to the shared volumes 132 may therefore be arbitrated by the master server 204. In one embodiment, an administration console may provide a graphical user interface (GUI) and/or command-line interface (CLI) for configuration of the networked backup environment 200. The administration console may also be provided in a controlling component such as the master server 204.

The SAN 222 is typically a high-speed network that allows the establishment of direct connections between storage devices (e.g., storage device 130A) and media servers 102. To enable connections between the storage devices and media servers 102, the SAN 222 may include various elements in a SAN fabric such as one or more switches, routers, hubs, etc. Various of the elements in the SAN fabric may include network and storage interfaces, memories, and processors operable to execute program instructions. In one embodiment, the media servers 102 and/or elements in the SAN fabric may include a volume manager that enables the management of physical storage resources as logical entities such as volumes.

Figure 3:
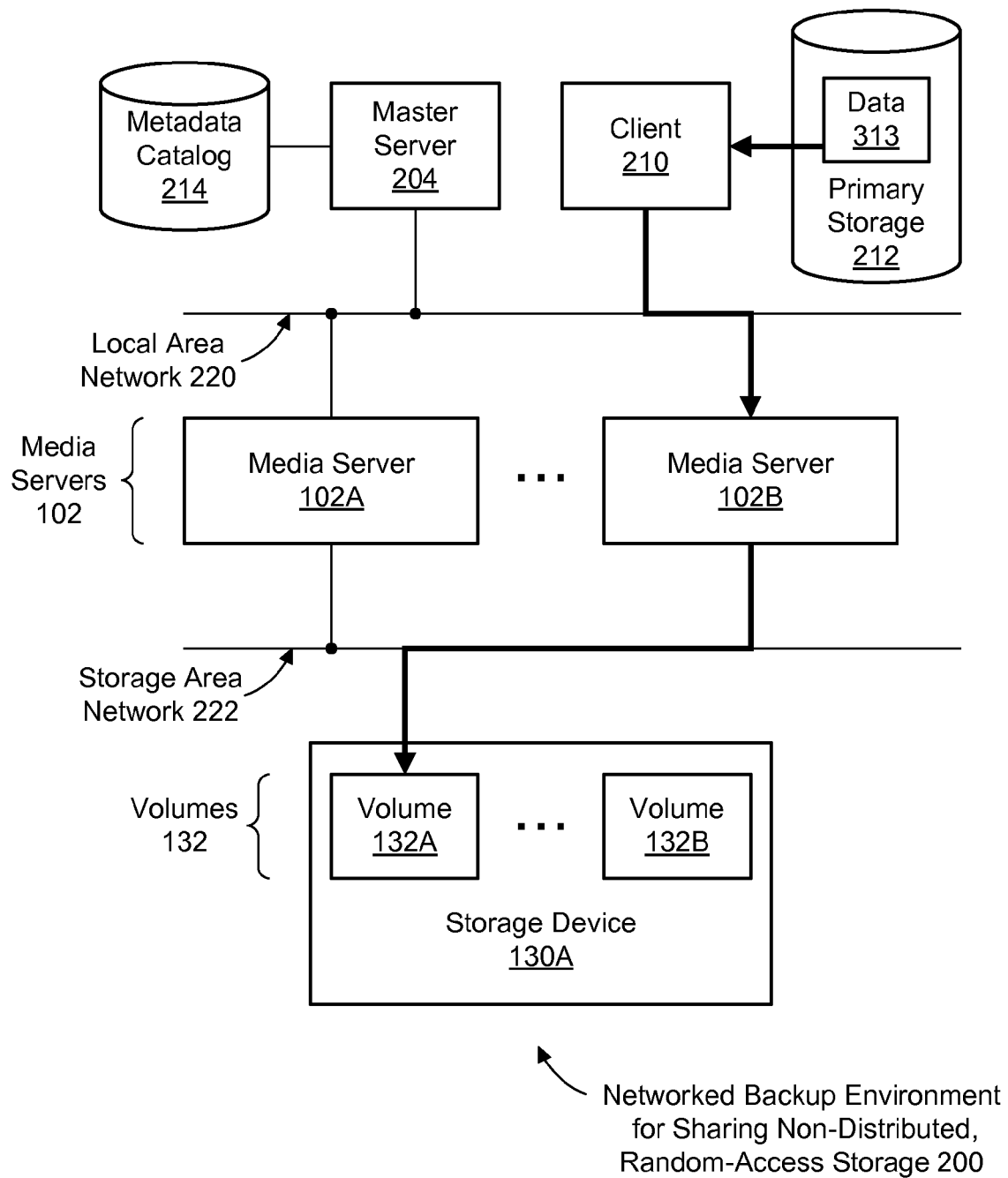
FIG. 3 illustrates a flow of data from primary storage to shared secondary storage in a networked backup environment according to one embodiment.

FIG. 3 illustrates a flow of data 313 from primary storage 212 to shared secondary storage 130A in the networked backup environment 200 according to one embodiment. The client 210 may be attached to primary storage 212 directly or over a network. In the example illustrated in FIG. 3, the primary storage 212 may include data 313 which is intended to be backed up. In one embodiment, the backup operation may be performed on a routine basis. In one embodiment, the backup operation may be scheduled and managed by the master server 204 according to user-specified and/or default parameters. The master server 204 may determine a particular media server 102B and a particular volume 132A for use in the backup operation to backup the data 313 or for use in a restore operation to restore data. The choice of the particular media server 102B and volume 132A may be based on various factors such as user-specified or default parameters, load-balancing considerations, availability considerations, etc.

In one embodiment, the data 313 may be read by the client 210 and sent to the appropriate media server 102B over the LAN 220. In another embodiment, where the media server 102B is coupled to the primary storage 212 through the LAN 220 or SAN 222, the media server 102B may read the data 313 from the primary storage 212 directly without the client 210 acting as an intermediary. As is described in greater detail with respect to FIG. 4, the media server 102B may access the target volume 132A (e.g., by mounting the volume 132A at the media server 102B) as needed for the purpose of writing the data 313 to the volume 132A. In one embodiment, the target volume 132A is not accessible to other media servers during the backup operation. After the completion of the backup operation, the target volume 132A may be made inaccessible to the media server 102B (e.g., by unmounting the volume 132A at the media server 102B). In a similar manner, the flow of data may be reversed to read the data 313 from the target volume 132A and restore the data 313 to another storage device.

Figure 4:
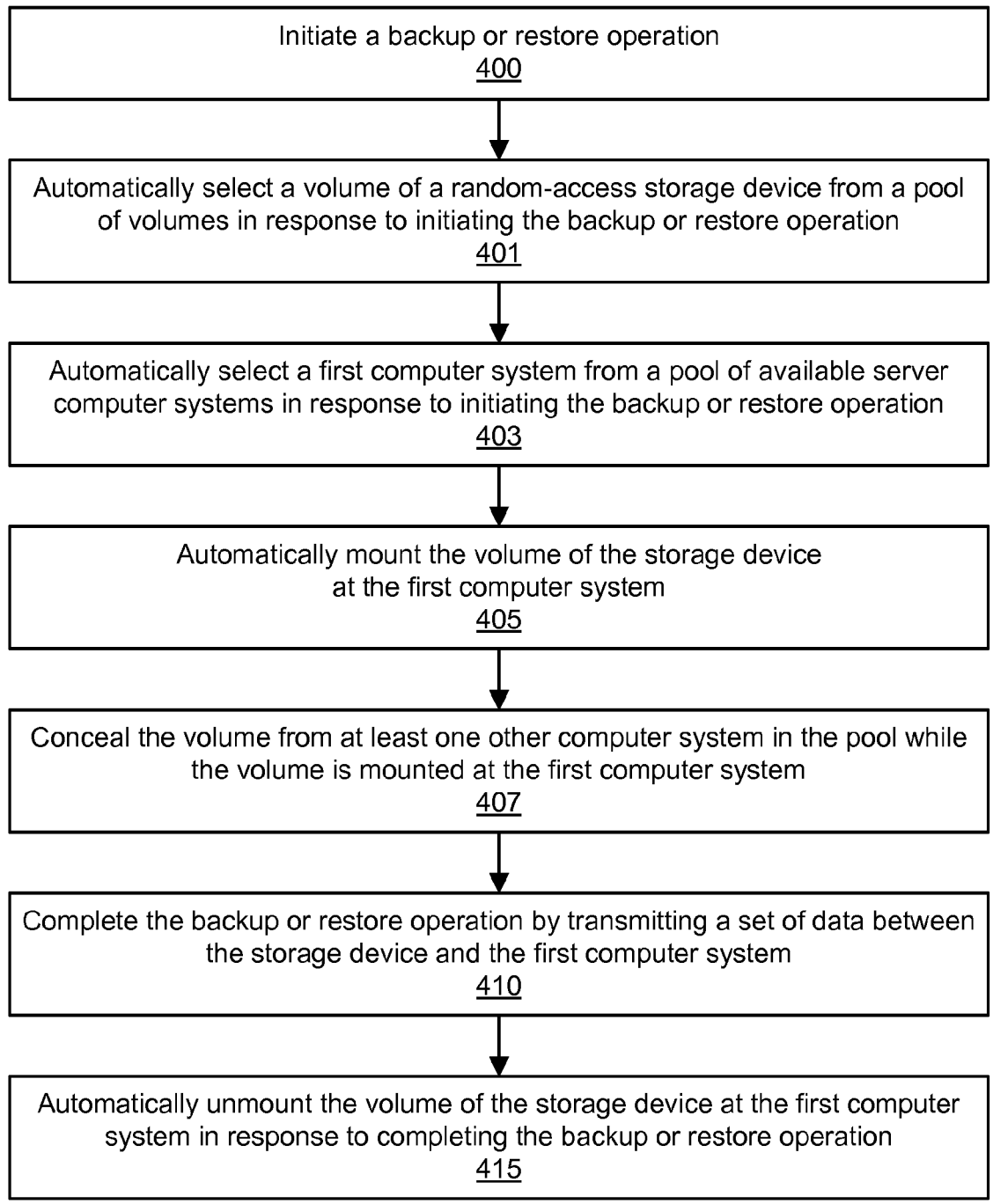
FIG. 4 is a flow diagram illustrating a method for performing a backup or restore operation using shared non-distributed, random-access storage according to one embodiment.

FIG. 4 is a flow diagram illustrating a method for performing a backup or restore operation using shared non-distributed, random-access storage according to one embodiment. As indicated at 400, a backup operation or a restore operation may be initiated with respect to a target set of data. Initiation of the backup or restore operation may comprise receiving a command from a user and/or the master server 204 to read or write the target set of data. As indicated at 401, a volume of a random-access storage device may be automatically selected from a pool of volumes in response to initiating the backup or restore operation in 400. As indicated at 403, a first computer system may be automatically selected from a pool of server computer systems which are available for performing the first backup or restore operation, wherein the first computer system is automatically selected in response to initiating the first backup or restore operation in 400.

As indicated at 405, a volume 132A of a random-access storage device 130A may be mounted at a first computer system (e.g., the media server 102B). In one embodiment, the volume 132A may be mounted at the first computer system in response to initiation of the backup or restore operation. As used herein, "mounting" comprises making the file system or other form of storage organization on the volume 132A readable and/or writable to the designated computer system. In one embodiment, the volume 132A may be mounted automatically (i.e., without user intervention) upon making a determination that the volume is to be used for the backup or restore operation. The determination that the volume is to be used for the backup or restore operation may be made by a controlling component such as the master server 204. The master server 204 may also designate the particular media server 102B for use in the backup or restore operation. As noted above, the master server 204 may implement load-balancing techniques in this manner. As is discussed above, the target volume 132A may host a non-distributed file system (i.e., a single-host file system) or other form of storage organization in which I/O for the volume is managed by one host at a time. As indicated at 407, the volume may be concealed from at least one other computer system while the volume is mounted at the first computer system. Suitable techniques for concealing the volume are discussed in greater detail below.

As indicated at 410, the backup or restore operation may be completed by transmitting the set of data between the random-access storage device and the computer system. For a backup operation, the set of data may be sent by the computer system to the storage device in response to an instruction to write the data. For a restore operation, the set of data may be read by the storage device and sent to the computer system in response to an instruction to read the data.

As indicated at 415, the volume may be unmounted at the computer system in response to completing the backup or restore operation. As used herein, "unmounting" comprises making the file system or other form of storage organization on the volume 132A unreadable and unwritable to the designated computer system. In one embodiment, the volume 132A may be unmounted automatically (i.e., without user intervention) after completion of the backup or restore operation. The unmounting may be dictated by a controlling component such as the master server 204.

While the designated computer system is performing the backup or restore operation using the volume, the volume may be inaccessible to other computer systems (e.g., media servers). In other words, access to the volume of the random-access storage device by another computer system may be prevented after mounting the volume at the designated computer system and before unmounting the volume at the designated computer system. If no backup or restore operation is being performed, the volume may be inaccessible to all the media servers 102. Various techniques may be used to implement this "time share" mechanism in various embodiments. For example, facilities provided by conventional storage area network (SAN) technology may be used to conceal volumes from media servers or otherwise enforce the sharing arrangements. The SAN facilities may include, for example, LUN-masking techniques, zoning techniques, SCSI persistent reservation techniques, etc. In one embodiment, a Logical Unit Number (LUN) comprising the volume may be masked (i.e., made invisible) from the media servers using standard LUN-masking techniques. The LUN may be unmasked to one media server at a time for the purpose of performing a backup or restore operation. In one embodiment, the LUN-masking capabilities may be provided for disk arrays. Using zoning techniques, the volume may be placed in a SAN zone that is inaccessible to the other computer systems. In one embodiment, techniques provided by a SAN volume manager may be used to make a target volume inaccessible to all but one media server at a time. Combinations of these and other suitable techniques may be used in further embodiments.

In one embodiment, a snapshot of the volume 132A may be maintained in the networked backup environment 200. Other computer systems may then be permitted to mount the snapshot (e.g., in read-only mode) while the backup or restore operation is proceeding. In this manner, one or more additional media servers may be permitted to read from the snapshot of the volume during the backup or restore operation.

Figure 5:
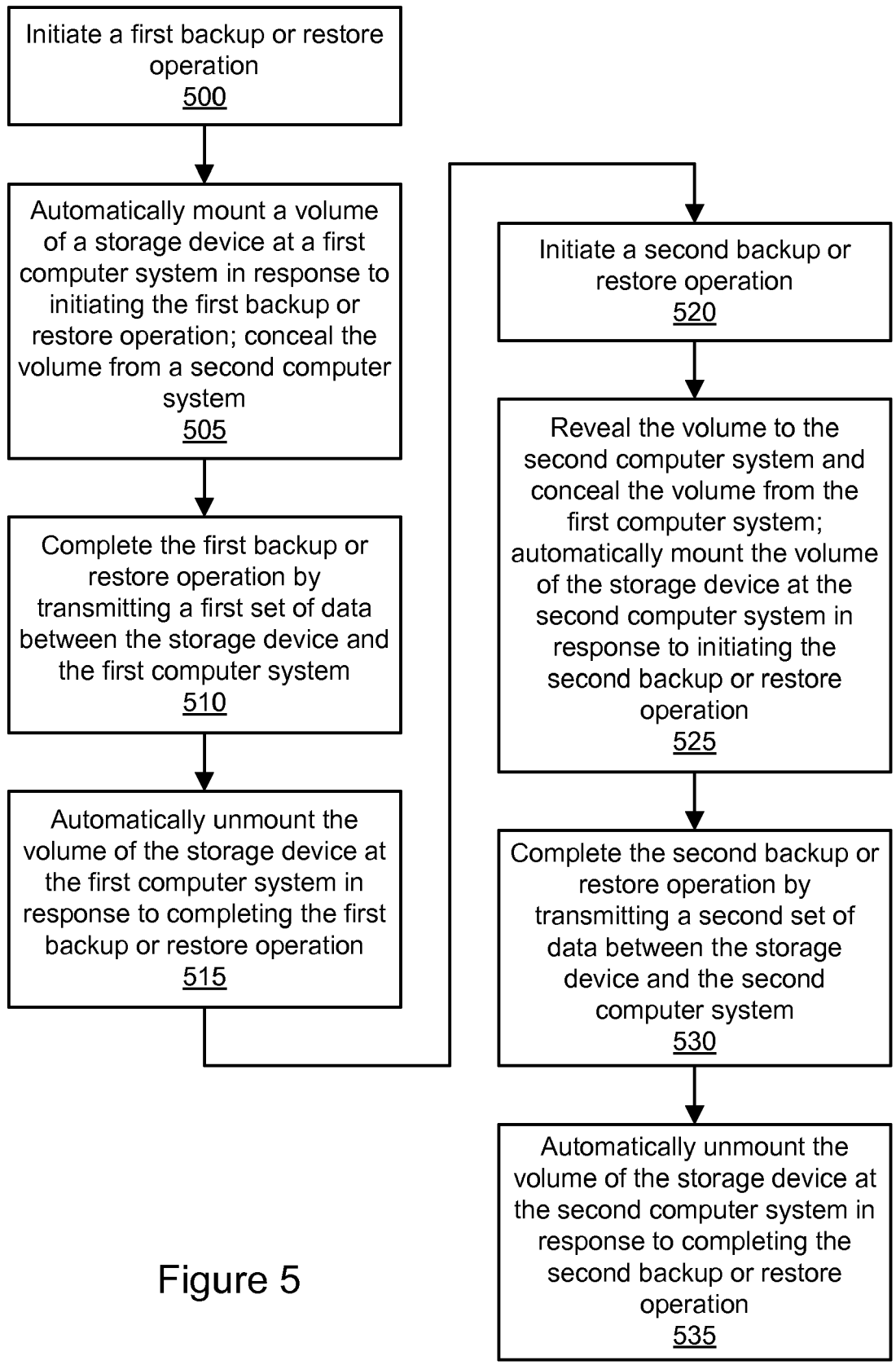
FIG. 5 is a flow diagram illustrating a method for performing backup and/or restore operations using non-distributed, random-access storage shared between two computer systems according to one embodiment.

FIG. 5 is a flow diagram illustrating a method for performing backup and/or restore operations using non-distributed, random-access storage shared between two computer systems according to one embodiment. As indicated at 500, a first backup or restore operation may be initiated with respect to a first set of data. As indicated at 505, a volume 132A of a random-access storage device 130A may be mounted at a first computer system (e.g., the media server 102A) in response to initiation of the first backup or restore operation. In one embodiment, the volume 132A may be mounted automatically (i.e., without user intervention) upon making a determination that the volume is to be used for the first backup or restore operation. As noted above, a controlling component such as the master server 204 may manage aspects of the first backup or restore operation. As also noted above, the target volume 132A may host a non-distributed file system (i.e., a single-host file system) or other form of storage organization in which I/O for the volume is managed by one host at a time. As also indicated at 505, the volume may be concealed from a second computer system while the volume is mounted at the first computer system. As indicated at 510, the first backup or restore operation may be completed by transmitting the first set of data between the random-access storage device and the first computer system. As indicated at 515, the volume may be unmounted at the first computer system in response to completing the first backup or restore operation. In one embodiment, the volume 132A may be unmounted automatically (i.e., without user intervention) after completion of the first backup or restore operation.

As indicated at 520, a second backup or restore operation may be initiated with respect to a second set of data. As indicated at 525, the same volume 132A used in the first backup or restore operation may be mounted at a second computer system (e.g., the media server 102B) in response to initiation of the second backup or restore operation. In one embodiment, the volume 132A may be mounted automatically (i.e., without user intervention) upon making a determination that the volume is to be used for the second backup or restore operation. As noted above, a controlling component such as the master server 204 may manage aspects of the second backup or restore operation. As also indicated at 525, the volume may be revealed to the second computer system prior to being mounted at the second computer system, and the volume may be concealed from the first computer system while it is mounted at the second computer system. As indicated at 530, the second backup or restore operation may be completed by transmitting the second set of data between the random-access storage device and the second computer system. As indicated at 535, the volume may be unmounted at the second computer system in response to completing the second backup or restore operation. In one embodiment, the volume 132A may be unmounted automatically (i.e., without user intervention) after completion of the second backup or restore operation.

In one embodiment, the techniques shown in FIG. 5 may be performed for two backup or restore operations acting upon a single set of data. In other words, the terms "first set of data" and "second set of data" in FIG. 5 may refer to the same set of data. For example, the first operation (as indicated in 500 through 510) may comprise a backup operation that stores a backup image on a shared volume. The second operation (as indicated in 520 through 530) may then be performed on the backup image. For example, a restore operation may read the backup image generated by the first operation. In this manner, the same set of data on a non-distributed storage device may be shared by a plurality of media servers.

Figure 6:
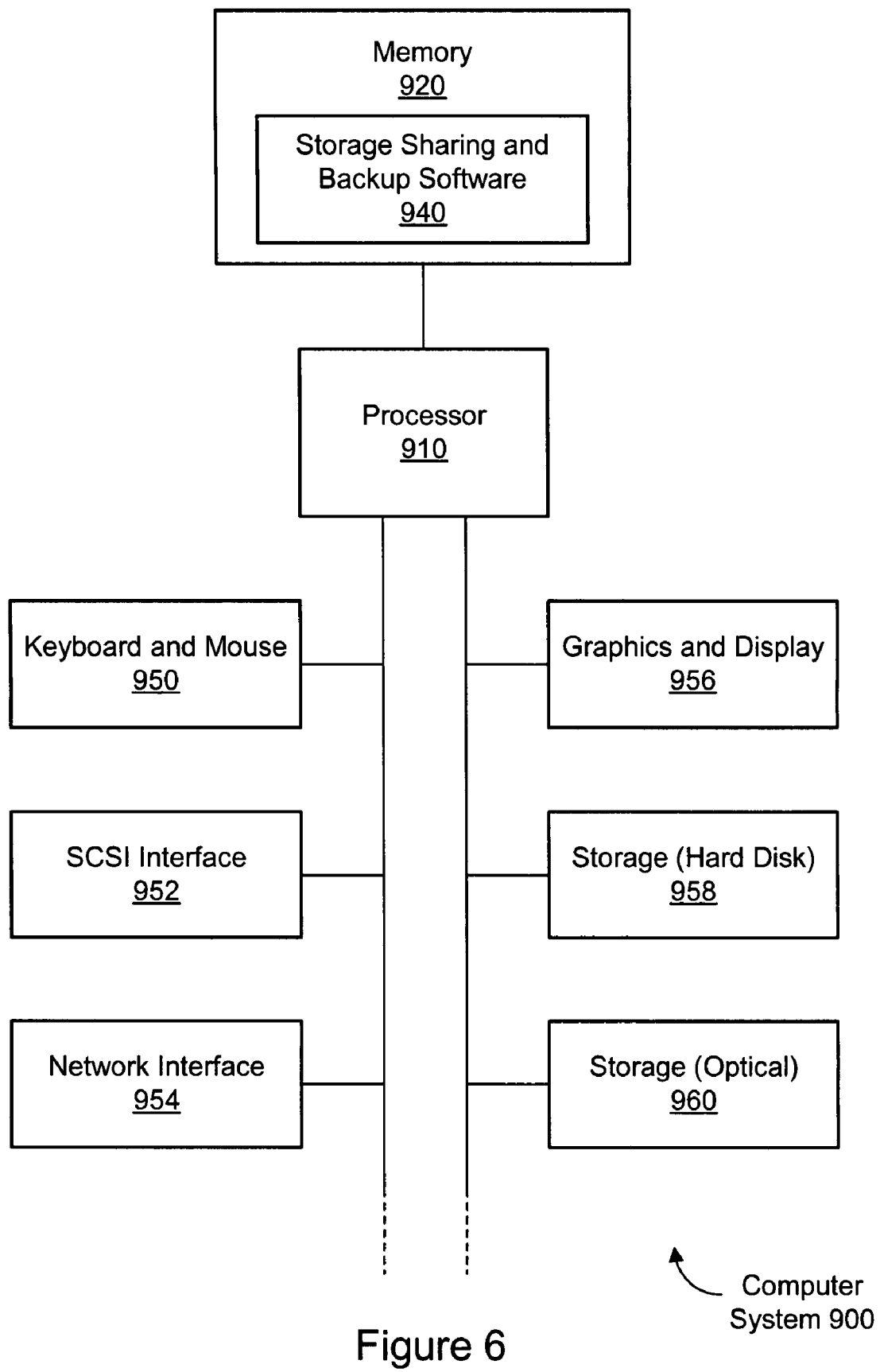
FIG. 6 illustrates a typical computer system configured to implement embodiments of the systems and methods described above.

FIG. 6 illustrates a block diagram of a typical computer system 900 for implementing embodiments of the systems and methods described above. Computer system 900 may be illustrative of various computer systems in the networked backup environment 100 or 200, such as a media server 102A or 102B, a client 210, a master server 204, and/or various elements in a SAN fabric. Computer system 900 includes a processor 910 and a memory 920 coupled by a communications bus. Processor 910 can be a single processor or a number of individual processors working together. Memory 920 is typically random access memory (RAM), or some other dynamic storage device, and is capable of storing instructions to be executed by the processor, e.g., software 940 for storage sharing and backup. Memory 920 is also used for storing temporary variables or other intermediate information during the execution of instructions by the processor 910.

Computer system 900 may also include devices such as keyboard & mouse 950, SCSI interface 952, network interface 954, graphics & display 956, hard disk storage 958, and optical storage 960, all of which may be coupled to processor 910 by at least one communications bus. Computer system 900 can also include numerous elements not shown in the figure, such as additional storage devices, communications devices, input devices, and output devices, as illustrated by the ellipsis shown.

The techniques and methods discussed above may be implemented in software as one or more software programs, using a variety of computer languages, including, for example, traditional computer languages such as assembly language and C; object oriented languages such as C++ and Java; and scripting languages such as Perl and Tcl/Tk. Software 940 may comprise program instructions executable by processor 910 to perform any of the functions or methods described above.

Various embodiments may further include receiving, sending, or storing instructions and/or data implemented in accordance with the foregoing description upon a computer-accessible medium. Generally speaking, computer-accessible media may include storage media or memory media such as magnetic or optical media, e.g., disk or CD-ROM, volatile or non-volatile media such as RAM (e.g. SDRAM, DDR, RDRAM, SRAM, etc.), ROM, etc. In one embodiment, computer-accessible media may include transmission media or signals such as electrical, electromagnetic, or digital signals, conveyed via a communication medium such as a network and/or a wireless link.

The various methods as illustrated in the Figures and described herein represent exemplary embodiments of methods. The methods may be implemented in software, hardware, or a combination thereof. The order of the method elements may be changed, and various elements may be added, reordered, combined, omitted, modified, etc. Method elements may be performed automatically (i.e., without user intervention) and programmatically (i.e., according to program instructions executed by a computer).

Various modifications and changes may be made as would be obvious to a person skilled in the art having the benefit of this disclosure. It is intended that the invention embrace all such modifications and changes and, accordingly, the above description and drawings to be regarded in an illustrative rather than a restrictive sense.

What is claimed is:

1. A method comprising:

concealing, from each computer system in a pool of server computer systems which are available for performing a first backup or restore operation, a volume of a random-access storage device;

initiating the first backup or restore operation while the volume is concealed from each computer system in the pool of server computer systems;

automatically selecting the volume of the random-access storage device from a pool of volumes in response to initiating the first backup or restore operation;

automatically selecting a first computer system from the pool of server computer systems which are available for performing the first backup or restore operation, wherein the first computer system is automatically selected in response to initiating the first backup or restore operation;

automatically mounting the volume of the random-access storage device at the first computer system, wherein the random-access storage device is coupled to the first computer system by a network, and wherein the volume is a component of a non-distributed storage stack and is not simultaneously readable or writable by more than one host computer system;

concealing the volume of the random-access storage device from each computer system other than the first computer system in the pool of server computer systems while the volume is mounted at the first computer system;

completing the first backup or restore operation by transmitting a first set of data between the random-access storage device and the first computer system;

automatically unmounting the volume of the random-access storage device at the first computer system in response to completing the first backup or restore operation; and concealing the volume of the random-access storage device from the first computer system after automatically unmounting the volume.

2. The method of claim 1, further comprising:

initiating a second backup or restore operation;

automatically mounting the volume of the random-access storage device at a second computer system in response to initiating the second backup or restore operation, wherein the random-access storage device is coupled to the second computer system by the network;

concealing the volume of the random-access storage device from the first computer system while the volume is mounted at the second computer system;

completing the second backup or restore operation by transmitting a second set of data between the random-access storage device and the second computer system; and automatically unmounting the volume of the random-access storage device at the second computer system in response to completing the second backup or restore operation.

3. The method of claim 1, further comprising:

revealing the volume of the random-access storage device to the at least one other computer system after unmounting the volume of the random-access storage device at the first computer system.

4. The method of claim 1, wherein the volume of the random-access storage device is concealed by masking a Logical Unit Number (LUN) comprising the random-access storage device from the at least one other computer system.

5. The method of claim 1, wherein the volume of the random-access storage device is concealed by placing the volume in a storage area network (SAN) zone that is inaccessible to the at least one other computer system.

6. The method of, claim 1, further comprising:

permitting the at least one other computer system to read a snapshot of the volume during the first backup or restore operation.

7. The method of claim 1, wherein access to the volume of the random-access storage device is arbitrated by a controlling component.

8. The method of claim 1, wherein the first backup or restore operation comprises a backup operation, and wherein the volume is automatically selected from the pool of volumes by a master server to implement load balancing; and wherein the first computer system is automatically selected from the pool of server computer systems by the master server to implement the load balancing.

9. A computer-readable storage medium comprising program instructions, wherein the program instructions are computer-executable to implement:

concealing a volume of a random-access storage device from each computer system in a pool of server computer systems which are available for performing a first backup or restore operation;

initiating the first backup or restore operation while the volume is concealed from each computer system in the pool of server computer systems;

automatically selecting the volume of the random-access storage device from a pool of volumes in response to initiating the first backup or restore operation;

automatically selecting a first computer system from the pool of server computer systems which are available for performing the first backup or restore operation, wherein the first computer system is automatically selected in response to initiating the first backup or restore operation;

automatically mounting the volume of the random-access storage device at the first computer system, wherein the random-access storage device is coupled to the first computer system by a network, and wherein the volume is a component of a non-distributed storage stack and is not simultaneously readable or writable by more than one host computer system;

concealing the volume of the random-access storage device from each computer system other than the first computer system in the pool of server computer systems while the volume is mounted at the first computer system;

completing the first backup or restore operation by transmitting a first set of data between the random-access storage device and the first computer system;

automatically unmounting the volume of the random-access storage device at the first computer system in response to completing the first backup or restore operation; and concealing the volume of the random-access storage device from the first computer system after automatically unmounting the volume.

10. The computer-readable storage medium of claim 9, wherein the program instructions are further, computer-executable to implement:

initiating a second backup or restore operation;

automatically mounting the volume of the random-access storage device at a second computer system in response to initiating the second backup or restore operation, wherein the random-access storage device is coupled to the second computer system by the network;

concealing the volume of the random-access storage device from the first computer system while the volume is mounted at the second computer system;

completing the second backup or restore operation by transmitting a second set of data between the random-access storage device and the second computer system; and automatically unmounting the volume of the random-access storage device at the second computer system in response to completing the second backup or restore operation.

11. The computer-readable storage medium of claim 9, wherein the program instructions are further computer-executable to implement:

revealing the volume of the random-access storage device to the at least one other computer system after unmounting the volume of the random-access storage device at the first computer system.

12. The computer-readable storage medium of claim 9, wherein the volume of the random-access storage device is concealed by masking a Logical Unit Number (LUN) comprising the random-access storage device from the at least one other computer system.

13. The computer-readable storage medium of claim 9, wherein the volume of the random-access storage device is concealed by placing the volume in a storage area network (SAN) zone that is inaccessible to the at least one other computer system.

14. The computer-readable storage medium of claim 9, wherein the program instructions are further computer-executable to implement:
permitting the at least one other computer system to read a snapshot of the volume during the first backup or restore operation.

15. A system comprising:
a master server computer system;
a first computer system;
a second computer system; and
a random-access storage device coupled to the first computer system and the second computer system by a network, wherein the random-access storage device comprises a volume and one or more additional volumes, and wherein the volume is a component of a non-distributed storage stack and is not simultaneously readable or writable by more than one host computer system;
wherein the master server computer system is configured to:
automatically select the volume of the random-access storage device for use in a first backup or restore operation, wherein the volume is concealed from the first computer system and the second computer system when the volume is automatically selected;
automatically select the first computer system for use in the first backup or restore operation;
wherein the first computer system is configured to mount the volume to perform the first backup or restore operation;
wherein the first computer system is configured to unmount the volume in response to completion of the first backup or restore operation;
wherein the volume is concealed from the second computer system during the first backup or restore operation; and
wherein the volume is concealed from computer system and the second computer system after the volume is unmounted.

16. The system of claim 15,
wherein the second computer system is configured to mount the volume to perform a second backup or restore operation in response to initiation of the second backup or restore operation;
wherein the second computer system is configured to unmount the volume in response to completion of the second backup or restore operation; and
wherein the volume is concealed from the first computer system during the second backup or restore operation.

17. The system of claim 15,
wherein the volume is concealed from the second computer system, during the first backup or restore operation by masking a Logical Unit Number (LUN) comprising the random-access storage device from the second computer system.

18. The system of claim 15,
wherein the volume is concealed from the second computer system during the first backup or restore operation by placing the volume in a storage area network (SAN) zone that is inaccessible to the at least one other computer system.

19. The system of claim 15, further comprising:
a master server coupled to the first computer system and the second computer system, wherein the master server is configured to arbitrate access to the volume of the random-access storage device.

20. The system of claim 15,
wherein a snapshot of the volume is readable by the second computer system during the first backup or restore operation.

* * * * *